United States Patent [19]

Khanarian et al.

[11] Patent Number: 5,783,624
[45] Date of Patent: Jul. 21, 1998

[54] TRANSPARENT POLYMER COMPOSITES HAVING A LOW THERMAL EXPANSION COEFFICIENT

[75] Inventors: Garo Khanarian, Berkeley Heights; Lak M. Walpita, Basking Ridge, both of N.J.

[73] Assignee: Hoechst Celanese Corporation, Warren, N.J.

[21] Appl. No.: 766,718

[22] Filed: Dec. 13, 1996

[51] Int. Cl.[6] .................................................. C08K 3/00
[52] U.S. Cl. .................. 524/494; 524/442; 524/445; 524/447; 524/448
[58] Field of Search .................................. 524/494, 442, 524/445, 447, 448

[56] References Cited

U.S. PATENT DOCUMENTS

| | | | |
|---|---|---|---|
| 4,186,234 | 1/1980 | Sakashita et al. | 428/283 |
| 5,428,098 | 6/1995 | Breckner et al. | 524/494 |
| 5,510,414 | 4/1996 | Okamoto et al. | 524/494 |

*Primary Examiner*—Edward J. Cain
*Attorney, Agent, or Firm*—Palaiyur S. Kalyanaraman

[57] ABSTRACT

Polymeric compositions having a high transparency, low thermal expansion coefficient and low coefficient of refractive index change with temperature are made from a suitable thermoplastic polymer and index-matched glass or ceramic. Such compositions have utility in optical applications.

29 Claims, No Drawings

1

TRANSPARENT POLYMER COMPOSITES HAVING A LOW THERMAL EXPANSION COEFFICIENT

RELATED APPLICATIONS

The invention disclosed in this patent application is related to that disclosed in U.S. patent application, Ser. No. 08/766,719, filed of even date herewith.

FIELD OF THE INVENTION

This invention relates generally to the field of materials having a high transparency and a low thermal expansion coefficient, and more particularly to composite materials comprising a thermoplastic polymer and fillers that have such properties.

BACKGROUND OF THE INVENTION

The lens industry is a fast growing industry. Traditionally glass has been the material of choice for making lenses. This is due to glass's several advantageous properties including excellent transparency as well as low thermal expansion coefficient. Optical glasses are usually described in terms of their refractive index at the sodium D line (589.3 nm) and their ν value (also called the Abbe number) which is a measure of the dispersion or variation of the refractive index with wavelength. Despite their several advantages, glass is a difficult substance to be molded into various shapes and designs. Because of this, more and more transparent plastics are increasingly used in the optics industry, particularly in the lens industry. Plastics possess greater flexibility in designing shapes and integrating additional mechanical features in the design of the lens. See, for example, N. J. Mills in *Encyclopedia of Polymer Science and Engineering*, Volume 10, pages 533–539, A Wiley-Interscience Publication by John Wiley & Sons, Inc., New York (1987).

Traditional plastic materials that are used in the lens industry include, for example, polyacrylates, polystyrene, polycarbonate and the like which possess high transparency. However, all these plastics have a deficiency compared to optical glasses, namely their thermal expansion coefficient is about one order of magnitude greater than glass. This results in changes in lens figure and also refractive index with temperature. Therefore the imaging properties of the lens change with temperature which is undesirable. There is a need in the industry for transparent plastic materials which can be molded into objects and whose refractive index does not change too much with temperature. In other words, they possess low thermal expansion coefficient.

High transparency/low thermal expansion coefficient ("CTE") composites have now been found that utilize a thermoplastic polymer and a suitable filler, and that are easy to fabricate without complex processing.

SUMMARY OF THE INVENTION

The desired inventive polymeric composites comprise a suitable thermoplastic polymer and a suitable glass (or ceramic) in a weight percent range 10:90 to 90:10. Suitable materials are defined below. The composites have a high transparency (at least about 70%) and a CTE of not more than $4 \times 10^{-5}/°C$. Furthermore, the coefficient of refractive index change with temperature, dN/dT, is substantially less than that of the matrix thermoplastic polymer resin. The dN/dT is in the range $-7 \times 10^{-5}/°C$ and zero. The inventive polymeric compositions are useful for making optical components, such as, for example, lenses. Objects from these composites have low Coefficient of Thermal Expansion ("CTE"), and high transparency suitable for such applications.

Examples of suitable plastics useful in the invention include polystyrene, polyacrylates, polycarbonate, polyamide, polyimide and polyolefins. Example of suitable glass are given below in Table 1. Many of them are commercially available. The refractive index difference is typically less than 0.01. The glass is ground to a fine powder with a particle size range between 0.01 and 0.5 μm. Generally, the glass or ceramic is added in about 10–90 weight percent to the polymer, preferably in a 10–70 weight percent and typically in 30–60 weight percent. The two ingredients are mixed in a suitable apparatus such as an extruder and compounded to yield the composite which may be molded into suitable objects.

The polymeric composites described above may optionally also include other optional fillers, which may enhance their applications.

DETAILED DESCRIPTION OF THE INVENTION

In one embodiment, this invention discloses polymer composites comprising a thermoplastic polymer and a glass or a ceramic in about 10–90 weight percent ratio. The composites have a high transparency (at least about 70%), a CTE of not more than $4 \times 10^{-5}/°C$., and their coefficient of refractive index change with temperature, dN/dT, is substantially less than that of the matrix thermoplastic polymer resin. The high transparency is important since the fields of applications for the composites are in the optical area, specifically lenses. The low CTE is also important in order to assure the mechanical structural integrity of objects molded from the composites. Such dN/dT numbers are essential if plastics are to replace glass in intended applications. The choice of materials for the composite composition dictates these properties. Thus, the refractive index of the glass/ceramic must be closely matched with that of the plastic over a wide wavelength range. In other words, the plastic and glass/ceramic must have not only close enough refractive indices but also closely matching Abbe numbers. In addition, the plastic and the glass or ceramic must be combined in suitable proportions, in order to enhance the properties for intended applications.

Thermoplastic polymers suitable for the composites may belong to any known class of polymers including polyvinyls, polyamides, polyesters, polyolefins, polycarbonate, polyamide, polyimide, polyesteramide, polyketones, polyetherketones and the like and mixtures thereof. Preferred are materials such as polyolefins and polyesters. Polyolefins include polyalkenes (such as, for example, polyethylene, polypropylene, polybutylene), polystyrene, and polymers containing cyclic olefin moieties. The latter may be homopolymers or copolymers of cyclic olefin monomers. Suitable cyclic olefin monomers include, for example, norbornene, tetracyclododecene, bicyclo[2,2,1]hept-2-ene, 1-methylbicyclo[2,2,1]hept-2-ene and hexacyclo[6,6,1,1$^{3,6}$,1$^{10,13}$,0$^{2,7}$,0$^{9,14}$]-4-heptadecene. If it is a cyclic olefin copolymer ("COC"), the comonomer or comonomers may be a suitable monomer including acyclic olefins such as, for example, ethylene, propylene, butylene and the like, or mixtures thereof. Many COCs are described, for example, in U.S. Pat. No. 5,087,677; U.S. Pat. Nos. 5,422,409; 5,324,801; 5,331,057; 4,943,611; 5,304,596 and EP 608903. An illustrative COC composition useful in the practice of this invention is a copolymer of norbornene and ethylene described in the above-mentioned U.S. Pat. No. 5,087,677 and available in different grades under the trade name TOPAS® from Hoechst Celanese Corporation, Somerville, N.J.

If the thermoplastic is a polyester, preferred are the polyesters such as, for example, polyethylene terephthalate ("PET"), polybutylene terephthalate ("PBT") and the like. Many of these are also commercially available, e.g., the HOSTAGLAS® brand PET from Hoechst Celanese Corporation.

Suitable glasses or ceramics are those which substantially match the selected thermoplastic in refractive index over a wide wavelength range as well as give optimal properties to the composite. Any refractive mismatch between the glass (or ceramic) and the matrix resin An should be less than 0.01 and preferably less than 0.003 in order to obtain transparent composites. Many such materials have been identified form commercial sources, and examples are provided in Table 1, which lists glasses suitable for various thermoplastic matrix resins. Table 1 also lists the refractive indices (at 589 nm), Abbe numbers and the CTE for the various resins and glasses. It is to be noted that mixtures of glasses and/or ceramics may also be used as the additive fillers for the resins if such mixtures conform to the desired properties.

powder is compounded into the respective plastic resin in an extruder and test parts may be molded for measuring the CTE and dN/dT.

The polymeric compositions may also be made into shaped articles such as, for example, films, sheets, plaques, discs, and other shapes which are particularly useful as lenses for optical applications. Three dimensional shapes may also be made. The polymers may be shaped by many processes, such as extrusion, injection molding, and compression molding. Films and sheets typically may be made by injection molding or extrusion processes. Such techniques are well known to those skilled in the art.

The invention is further illustrated by the following non-limiting examples.

EXAMPLES

Example 1

The compounding of glass and polymer may be performed as follows. Thus, for example, ground glass powder of the brand MBC 540597 (from Pilkington Glass, Clwyd, United Kingdom) is compounded in a cyclic olefin copolymer (the TOPAS 6013 brand COC from Hoechst Celanese Corporation, Somerville, N.J.) in a 50% weight fraction. The

TABLE 1

| | Resin | | | Glass | | |
|---|---|---|---|---|---|---|
| Thermoplastic resin | refractive index @ 589 nm | Abbe | CTE × $10^{-5}$/°C. | Refractive Index for matching glass* | refractive index @ 589 nm | Abbe | CTE × $10^{-5}$/°C. |
| Topas COC | 1.533 | 56 | 6 | MBC 540597 | 1.5399 | 59 | 0.8 |
| | | | | TF 529516 | 1.5294 | 51.6 | 0.6 |
| acrylic | 1.491 | 57 | 6.5 | BSC 510644 | 1.5097 | 64.4 | 0.77 |
| | | | | ZC 508612 | 1.50847 | 61.2 | 0.5 |
| polycarbonate | 1.586 | 30 | 7 | DBC 589613 | 1.58913 | 61.3 | 0.56 |
| | | | | LF 581409 | 1.58144 | 40.8 | 0.98 |
| polystyrene | 1.59 | 31 | 8 | DBC 589613 | 1.58913 | 61.3 | 0.56 |
| | | | | LF 581409 | 1.58144 | 40.8 | 0.98 |
| Hostaglas amorphous PET | 1.576 | 25 | 6 | MBC 573575 | 1.5725 | 57.5 | 0.69 |
| | | | | LF 575415 | 1.57501 | 41.5 | 0.8 |
| | | | | BLF 574521 | 1.57393 | 52.1 | 0.95 |

*Pilkington Special Glasses, Clwyd, UK

Another embodiment of the present invention provides a process to make the highly transparent polymer compositions. The polymer compositions may be made by standard methods for making compounds of polymers and fillers. These methods typically involve mixing the filler (the glass or the ceramic) and the polymer at a temperature high enough to melt the polymer. Compounding of the polymer and ceramic filler in a suitable extruder is a preferred method. Prior to extrusion, the selected glasses are ground into small sizes of the order 0.01 to 0.5 µm, preferably in the range 0.01–0.5 µm. Thus, for example, in a preferred method, the selected glasses are ground into small sizes of the order 0.01–0.5 µm in a SZEGVARI ATTRITOR (available from Union Process, Akron, Ohio) using a wet process. Other methods to obtain small particles of glass include dry processes such as a fluidized bed jet mill (available from Hosokawa Micron Powder Systems, Summit, N.J.) and chemical synthesis of nanoclusters. See for example, M. L. Steigerwald and L. E. Brus in *Annual Review of Material Science*, volume 19, pages 471–495, Annual Review Inc. PALO ALTO, Calif. (1989). The glass extruder may be a Leistritz twin screw extruder (Model MC 18GG/GL, available from American Leistriz Extruder Corporation, Somerville, N.J.) and the barrel temperature may be about 230° C. The compounding may be at about 100 rpm. The extrudate is molded into tensile bars in an Arburg All Rounder (Model 220M, available from Polymer Machinery, Berlin, Conn.). The CTE and dN/dT of the tensile bar are measured. CTE may be measured by thermomechanical analysis. dN/dT may be measured by Abbe refractometer. The CTE is likely to be reduced to about $3 \times 10^{-5}$/°C. and the dN/dT reduced to about half.

Example 2

As in the previous Example, ground powder of the ZC 508612 brand (from Pilkington Glass) is compounded in an acrylic polymer, V826 from Rohm and Haas Company, Philadelphia, Pa. The weight fraction of glass is 50%. The extruder is a Leistritz twin screw and the barrel temperature is about 180° C. The compounding is at about 100 rpm. The extrudate is molded into tensile bars in an Arburg All Rounder. The CTE and dN/dT of the tensile bar are measured. The CTE is likely to be reduced to about $3\times10^{-5}/°C$. and the dN/dT reduced to about half that of the acrylic resin.

Example 3

Ground powder of the LF 581409 brand (from Pilkington Glass) is compounded in polycarbonate (the OQ 1020 brand polycarbonate from General Electric Company, Plastics Division, Pittsfield, Mass.). The weight fraction of glass is 50%. The extruder is a Leistritz twin screw and the barrel temperature is about 230° C. The compounding is at about 100 rpm. The extrudate is molded into tensile bars in an Arburg All Rounder. The CTE and dN/dT of the tensile bar are measured. The CTE is likely to be reduced to about $3\times10^{-5}/°C$. and the dN/dT reduced to about half.

Example 4

Ground powder of the DBC 589613 brand (from Pilkington Glass) is compounded in polysytrene (the Styron 666D brand polystyrene from Dow Chemical Company, Midland, Mich.). The weight fraction of glass is 50%. The extruder is a Leistritz twin screw and the barrel temperatures about 180° C. The compounding is at about 100 rpm. The extrudate is molded into tensile bars in an Arburg All Rounder. The CTE and dN/dT of the tensile bar are measured. The CTE is likely to be reduced to about $3\times10^{-5}/°C$. and the dN/dT reduced to about half.

Example 5

Ground powder of the LF 575415 brand (from Pilkington Glass) is compounded in modified polyethylene terephthalate (the T 80 brand bottle resin grade PET from Hoechst Celanese). The weight fraction of glass is 50%. The extruder is a Leistritz twin screw and the barrel temperature is 270° C. The compounding is at 100 rpm. The extrudate is molded into tensile bars in an Arburg All Rounder. The CTE and dN/dT of the tensile bar are measured. The CTE is likely reduced to about $3\times10^{-5}/°C$. and the dN/dT reduced to about half.

It is to be understood that the above-described embodiments of the invention are illustrative only and that modification throughout may occur to one skilled in the art. Accordingly, this invention is not to be regarded as limited to the embodiments described herein.

We claim:

1. A polymer composite moldable into articles, said composite comprising (a) a thermoplastic polymer and (b) a glass or a ceramic, in about 10:90 weight percent to about 90:10 weight percent ratio, wherein said thermoplastic polymer and said glass or ceramic are substantially matched in refractive index and Abbe number, and further wherein said molded articles possess at least about 70 percent transparency, a thermal expansion coefficient not more than $4\times10^{-5}/°C$., and a coefficient of refractive index change to temperature, dN/dT, in the range $-7\times10^{-5}/°C$. and zero.

2. The composite as described in claim 1, wherein component (b) is glass.

3. The composite as described in claims 1, wherein component (b) is ceramic.

4. The composite as described in claim 1, wherein said thermoplastic polymer is selected from the group consisting of polyolefin, polyacrylate, polyvinyl, polycarbonate, polyamide, polyimide and polyester.

5. The composite as described in claim 4, wherein said polyolefin is selected from the group consisting of polyethylene, polypropylene, polybutylene, cyclic olefin homopolymer and cyclic olefin copolymer.

6. The composite as described in claim 5, wherein said polyolefin is a cyclic olefin copolymer.

7. The composite as described in claim 6, wherein said cyclic olefin copolymer is a copolymer of a cyclic olefin monomer and an acyclic olefin.

8. The composite as described in claim 7, wherein said cyclic olefin monomer is selected from the group consisting of norbornene, tetracyclododecene, bicyclo[2.2.1]hept-2-ene, 1-methylbicyclo[2.2.1]hept-2-ene and hexacyclo[6.6.1.$1^{3,6}$.$1^{10,13}$.$0^{2,7}$.$0^{9,14}$]-4-heptadecene.

9. The composite recited in claim 8, wherein said cyclic olefin monomer is norbornene.

10. The composite of claim 8, wherein said acyclic olefin is selected from the group consisting of ethylene, propylene, butylene and pentene.

11. The composite recited in claim 10, wherein said acyclic olefin is ethylene.

12. The composite of claim 4, wherein said thermoplastic polymer is a polyester.

13. The composite of claim 12, wherein said polyester is polyethylene terephthalate or polybutylene terephthalate.

14. The composite as described in claim 1, wherein said weight percent ratio is 20:80 to 80:20.

15. The composite as described in claim 1, wherein said weight percent ratio is 30:70 to 70:30.

16. The composite as described in claim 1, wherein said thermal expansion coefficient is not more than $3\times10^{-5}/°C$.

17. The composite as described in claim 1, wherein said transparency is at least about 80%.

18. The composite as described in claim 1, wherein said transparency is at least about 90%.

19. The composite as described in claim 1, wherein said dN/dT is in the range $-5\times10^{-5}/°C$. and zero.

20. The composite of claim 1, wherein the refractive index or said thermoplastic polymer and the refractive index of said glass or ceramic are different by no more than 0.01.

21. The composite of claim 1, wherein said glass or ceramic has particle size in the range 0.01 and 5 µm.

22. A process of preparing an article possessing at least about 70 percent transparency, a thermal expansion coefficient not more than $4\times10^{-5}/°C$. and a coefficient of refractive index change to temperature, dN/dT, in the range $-7\times10^{-5}/°C$. and zero, said process comprising: (a) providing a mixture of a thermoplastic polymer and a glass or a ceramic in about 10:90 weight percent to about 90:10 weight percent ratio, wherein said thermoplastic polymer and said glass or ceramic are substantially matched in refractive index and Abbe number; (b) intimately mixing and compounding said mixture in a suitable apparatus under suitable conditions; and (c) molding the article.

23. The process as described in claim 22, wherein said step (c) is an extrusion.

24. The process as described in claim 22, wherein said step (c) is injection molding.

25. The process as described in claim 22, wherein said thermoplastic polymer is selected from the group consisting of polyolefin, polyacrylate, polyvinyl, polycarbonate, polyamide and polyester.

26. The process as described in claim 25, wherein said thermoplastic polymer is a polyolefin.

27. The process as described in claim 26, wherein said polyolefin is a cyclic olefin copolymer.

28. A process of preparing an article possessing at least about 70 percent transparency, a thermal expansion coefficient not more than $4 \times 10^{-5}/°C$, and a coefficient of refractive index change to temperature, dN/dT, in the range $-7 \times 10^{-5}/°C$ and zero, said process comprising: (a) providing a mixture of a cyclic olefin copolymer and a glass in about 10:90 weight percent to about 90:10 weight percent ratio, wherein said copolymer and said glass are substantially matched in refractive index and Abbe number; (b) intimately mixing and compounding said mixture in a suitable apparatus under suitable conditions; and (c) molding the article.

29. The process as described in claim 27, wherein said cyclic olefin copolymer is a copolymer of norbornene and ethylene.

* * * * *